Oct. 10, 1967  C. C. ARMSTRONG, JR  3,346,139
GASKET MOUNTABLE UPON DRUM HEAD BEAD
Filed June 25, 1965
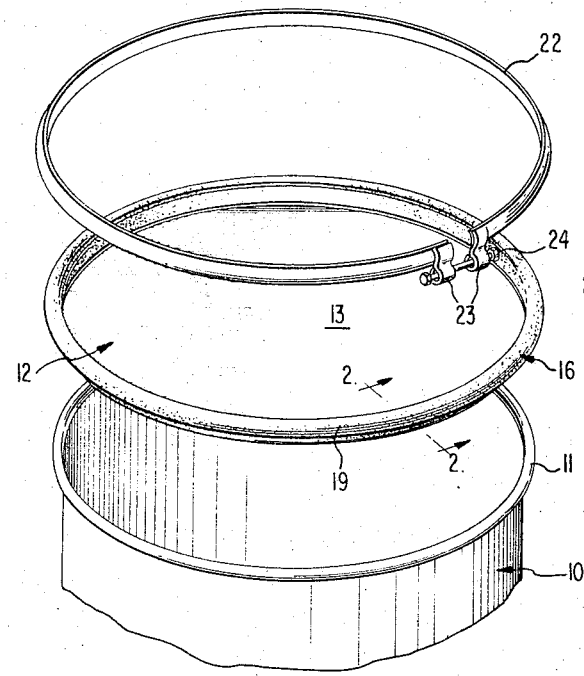
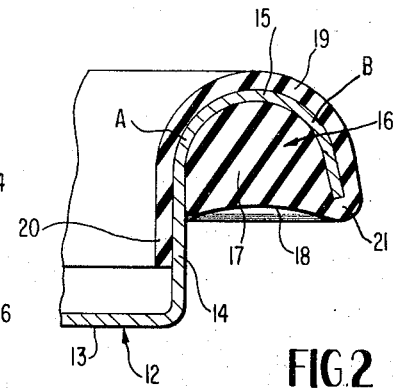
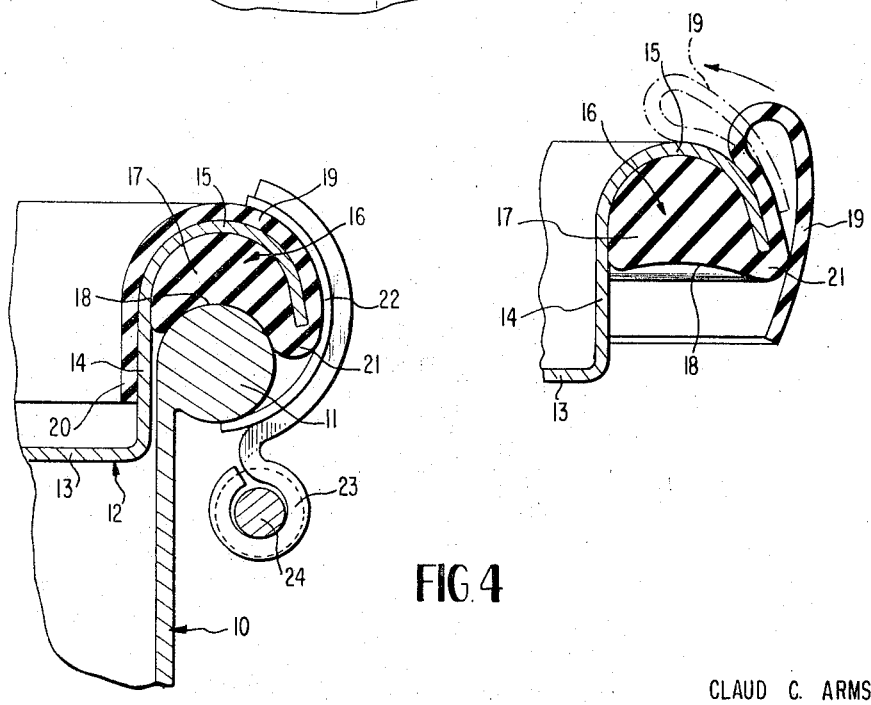
INVENTOR
CLAUD C. ARMSTRONG, JR.
BY
*B. P. Fishburn, Jr.*
ATTORNEY

United States Patent Office 3,346,139
Patented Oct. 10, 1967

3,346,139
GASKET MOUNTABLE UPON DRUM HEAD BEAD
Claud C. Armstrong, Jr., Rte. 4, Cely Road, Easley, S.C. 29640
Filed June 25, 1965, Ser. No. 466,969
1 Claim. (Cl. 220—46)

ABSTRACT OF THE DISCLOSURE

A closure structure for drums having rounded beads at the open tops thereof. The closure head for the drum has an arcuate flange to engage over the bead and a compressible drum sealing gasket is disposed within the concave flange and has a flap which extends snugly over the exterior of the flange and around the top of the same to prevent undesirable separation.

---

This invention relates to closures for sheet metal drums and like receptacles and more particularly to an improved drum head gasket or seal.

A primary object of the invention is to provide an improved drum head gasket or seal which will not become separated from the drum head or lid by the normal handling of the lid prior to application to the drum.

Another important object is to provide a gasket which may be easily applied to the bead or rim of the drum head and which will cling to said bead firmly until it is desired to remove the gasket by a positive peeling or stripping action.

Another object is to provide a gasket of the mentioned type which will result in a saving of considerable time for the user, and will provide a more effective seal for the container or drum with which it is employed.

Other objects and advantages of the invention will be apparent during the course of the following detailed description.

In the accompanying drawings forming a part of this application and in which like numerals are employed to designate like parts throughout the same, FIGURE 1 is a fragmentary exploded perspective view of a drum gasket and associated elements embodying the invention;

FIGURE 2 is an enlarged fragmentary radial section through the gasket and drum head, taken on line 2—2 of FIGURE 1;

FIGURE 3 is a similar section illustrating the manner in which the gasket is applied to the drum head; and FIGURE 4 is an enlarged fragmentary vertical section showing the assembled relation of the parts illustrated in FIGURE 1.

In the drawings, wherein for the purpose of illustration is shown a preferred embodiment of the invention, the numeral 10 designates a conventional drum, such as a steel drum, or fiber drum, equipped at one end with an annular rounded bead 11. A head or lid 12 for the drum 10 is provided including a central flat body portion 13 and a marginal upstanding wall 14 which fits inside of the drum side wall in assembly, as shown in FIGURE 4. The upstanding wall 14 of the drum head terminates in a rounded annular bead or flange 15 integral therewith adapted to overlie and receive the drum bead 11 in assembly, FIGURE 4. The above elements are conventional and need not be described in further detail.

The gasket proper, according to the invention, is designated in its entirety by the numeral 16 and constitutes an integral one-piece section of rubber or rubber-like material having a substantial degree of elasticity and resiliency, although firm enough to provide an adequate seal and to perform the other necessary functions, to be described.

The gasket 16 may be formed by molding or extruding, and its ends, not shown, may be joined in any conventional manner to form a complete annulus. The gasket comprises a relatively thick body portion 17 whose lower annular face 18 is preferably slightly concave to engage the bead 11. The gasket 16 further comprises an integral relatively thin extension or flap 19 which is tensioned to normally assume the shape and position shown in FIGURE 2, wherein the flap extends over and around the exterior of the head bead 15, preferably in snug fitting relation thereto. It will also be noted in FIGURE 2 that the extremity 20 of flap 19 extends substantially over the inner face of the wall 14, it being understood that the entire flap 19 is annular.

The thick solid body portion 17 of the gasket 16 fits snugly inside of the hollow bead 15 and preferably exerts a substantial radial pressure outwardly thereon, particularly at the opposite sides of the bead 15 indicated approximately at the points A and B in FIGURE 2. A slightly thickened marginal part 21 of the gasket engages around the free edge of the bead 15 in snug fitting relation thereto. The entire gasket, when assembled, to the bead 15 in the manner shown in FIGURE 2 clings to the same due to the elasticity and tension of the gasket and will not separate from the drum head accidentally during handling of the drum head. This separation of sealing gasket from drum head bead is a constant problem which plagues the industry, and this problem has been fully overcome by the invention.

FIGURE 3 illustrates the application of the gasket 16 to the head bead 15. As shown in this figure, the body portion 17 is first pressed firmly into the interior of the bead 15 and exerts a firm radial pressure outwardly thereon due to slight compression of the resilient body portion which in the relaxed condition is somewhat larger than the interior of the bead 15.

The flap 19 is then applied over the edge of the bead 15 and is rolled onto and around the bead 15 as shown by the broken lines in FIGURE 3, until the flap assumes the assembled condition shown in FIGURE 2. The elastic flap 19 is pretensioned to cling to the bead 15 and to assume normally the position shown in FIGURE 2. When desirable, the gasket may be stripped or peeled from the bead 15 by an operation which is the reverse of that shown in FIGURE 3. However, once assembled to the bead 15, the gasket 16 will adhere or cling firmly thereto.

A closing or clamping ring 22 is provided, arcuately formed in cross section as shown in FIGURE 4. The ends of the closing ring carry knuckles 23 welded thereto, adapted to receive a clamping bolt 24 which serves to draw the ring into tight clamping engagement with the exterior face of the gasket flap, FIGURE 4. Preferably, prior to application of the closing ring, a soapy solution or water is applied to that portion of the gasket coming into contact with the ring. The purpose of this is to prevent frictional drag when the ring is tightened. In any event, the gasket preferably has a smooth skin provided thereon during manufacturing and this also reduces friction.

In use, the drum lid 12 with the gasket 16 mounted thereon is applied to the top of the drum 10 and the drum bead 11 engages the concave face 18 of the gasket body.

The closing ring 22 is now applied over and around the gasket and this ring is tightened by means of the bolt 24. When this occurs, both an inward radial and downward vertical force is applied by the ring to the bead 15 and gasket 16 and the body portion of the gasket is compressed in two directions, downwardly and inwardly to form a firm fluid-tight seal with the drum bead 11. The compressed or sealing condition of the gasket is illustrated in FIGURE 4.

It should be mentioned that other forms of closing rings may be employed including conventional lever-operated rings of known construction. The action is the same in connection with the invention gasket regardless of which type of closing ring is used.

It is believed that the advantages of the invention over the prior art are now fully apparent without the necessity for any further description.

It is to be understood that the form of the invention herewith shown and described is to be taken as a preferred example of the same, and that various changes in the shape, size and arrangement of parts may be resorted to, without departing from the spirit of the invention or scope of the subjoined claim.

Having thus described my invention, I claim:

A drum closure for a drum having an annular marginal bead at its mouth, said bead being arcuate in cross section at least on its upper side, a drum closure head for the mouth of the drum having a marginal continuous annular flange which is arcuate in cross section and downwardly concave so as to fit over said bead, said flange cross-sectional arc extending substantially for 180° so that the downwardly concave flange is approximately semi-circular at all points on its circumference, a compressible drum sealing gasket including a thick body portion snugly engaged within the concave flange and being annular and extending for the entire circumference of the flange, said thick body portion disposed directly opposite said annular bead for compressive engagement against the latter and said thick body portion substantially filling the concave interior of the flange while in a relaxed condition, a relatively thin integral flap extension on the outer margin of the thick body portion and being of uniform thickness and extending around and completely covering the free marginal edge of said flange and extending over the entire exterior arcuate surface of the flange to the interior side thereof, said flap extension pre-tensioned to cling to said flange but being pealable therefrom when desired, said flap extension preventing separation of said gasket from said flange during normal handling of the closure head, and an exterior clamping ring engaging the flap extension and said drum bead for firmly securing the closure head to the drum with said thick body portion substantially compressed against the bead.

References Cited
UNITED STATES PATENTS

| | | | |
|---|---|---|---|
| 1,904,091 | 4/1933 | Shoop | 220—46 |
| 2,309,617 | 1/1943 | Benson | 220—46 |
| 2,680,536 | 6/1954 | Kojan | 220—46 |
| 3,204,811 | 9/1965 | Fine | 220—46 |

FOREIGN PATENTS

| | | |
|---|---|---|
| 1,009,101 | 5/1957 | Germany. |

JOSEPH R. LECLAIR, *Primary Examiner.*

JAMES R. GARRETT, *Examiner.*